United States Patent [19]
MacCallumMhor et al.

[11] Patent Number: 6,149,071
[45] Date of Patent: Nov. 21, 2000

[54] FLOW CONTROL SYSTEM FOR SPRAY APPLICATIONS

[75] Inventors: David Frederick MacCallumMhor, Clinton Township; David H. McNitt, Allenton, both of Mich.

[73] Assignee: Global Metering Solutions, LLC, Troy, Mich.

[21] Appl. No.: 09/329,806

[22] Filed: Jun. 10, 1999

Related U.S. Application Data

[60] Provisional application No. 60/088,715, Jun. 10, 1998.

[51] Int. Cl.[7] ........................................... A01G 27/00
[52] U.S. Cl. ............................ 239/67; 239/69; 700/283
[58] Field of Search ................................ 239/1, 69, 68, 239/67; 700/282, 283 P

[56] References Cited

U.S. PATENT DOCUMENTS

| | | | |
|---|---|---|---|
| 5,047,965 | 9/1991 | Zlokovitz | 700/282 |
| 5,272,620 | 12/1993 | Mock et al. | 700/282 |
| 5,961,040 | 10/1999 | Traylor et al. | 239/69 |

*Primary Examiner*—Andres Kashnikow
*Assistant Examiner*—Lisa Ann Douglas
*Attorney, Agent, or Firm*—Reising, Ethington, Barnes, Kisselle, Learman & McCulloch, P.C.

[57] ABSTRACT

A spray control system for applying a coating composition to an object. The control system includes an applicator, flow control valve, flow meter, and an electronic controller connected to the valve and flow meter. The controller regulates the flow of coating composition to maintain it at a user-specified setpoint. The controller includes a learn mode in which it learns the proper valve setting for a particular setpoint and stores a valve control signal that is later used at the start of a spray application to initially set the valve at the proper position. Then, once the flow of material begins, the controller uses either incremental or proportional control, or both, to maintain the flow at the specified setpoint. When learning a setpoint, the controller also stores the current values of a number of user-specified process parameters, such as ambient air temperature and the coating composition source pressure. These stored parameter values are then monitored during the spray application and an alarm notification is provided if they drift outside of a window about their stored values. The controller is configured to adapt to changing environmental and operational conditions by re-learning the proper valve setting for a particular setpoint each time the flow sufficiently stabilizes at the setpoint. Circuitry is also disclosed for use in connection with the flow meter to quickly determine the flow rate at the commencement of material flow and to provide fast updating of a conventional digital readout of flow rate.

20 Claims, 9 Drawing Sheets

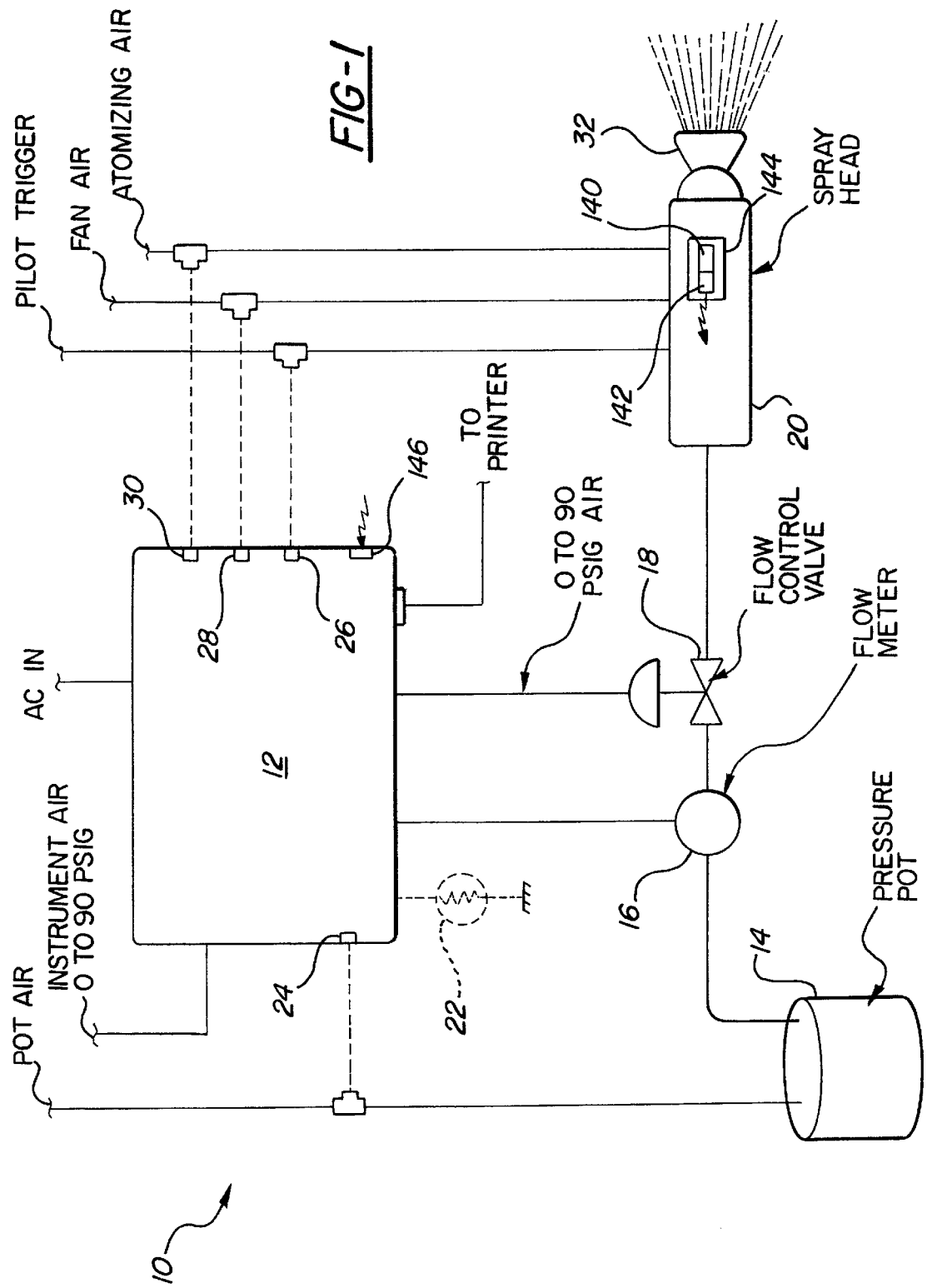

FLOW CONTROL SYSTEM FOR SPRAY APPLICATIONS

This application claims the benefit of U.S. Provisional No. 60/088,715 filed Jun. 10, 1998.

TECHNICAL FIELD

This invention relates generally to systems for controlling the flow of fluid delivered to a spray nozzle and, more particularly, to flow control systems used for applying coating compositions to an object.

BACKGROUND OF THE INVENTION

Spray control systems are used for applying paints and other coating compositions to a wide variety of plastic, metal, and optical components. In many of these applications, it is beneficial if not important to achieve a uniform thickness of coating material. Consequently, spray control systems typically utilize closed loop control to regulate the flow of coating material to the spray gun or other applicator. These closed loop control schemes use the error between the measured flow and a setpoint to provide negative feedback that drives the flow toward the setpoint. PID (proportional plus integral plus derivative) control is common among these control schemes.

While closed loop control provides accurate regulation of the flow to the setpoint, there are some inherent shortcomings in its use in spray control systems. First, since the typical closed loop control schemes rely on an error between the setpoint and measured flow, the controller must wait for the flow to begin and be measured so that it can determine the error needed for adjusting the flow control valve. This causes the flow to ramp up to its setpoint each time the flow is begun. Secondly, in control systems that utilize PID loops, the initial flow as a function of time can be dependent on the flow rate selected, with the initial flow ramping up exponentially for some flow rates and oscillating or ringing for others. Consequently, these control systems are sometimes tuned for a particular flow rate and do not react as desired when other flow rates are selected by the operator.

Mass flow meters are sometimes used in spray control systems. These meters typically provide a pulse train having a repetition rate that varies with the flow of material past the meter. Conventional spray control systems determine the flow rate by counting how many pulses are received from the meter over the course of a period of time. While accurate, this approach is somewhat slow and can cause a delay in both the feedback loop and the update time for the control system's flow rate display. Often, these displays are digital readouts that use a number of conventional seven-segment LEDs to provide a digital display of the flow rate. The display is usually controlled with a single conventional driver that receives a train of clock pulses that are counted by the driver and used in determining which of the segments of each LED should be illuminated. Then, to display a particular number, the driver is simply provided with that number of clock pulses. However, when this conventional display scheme is used for multi-digit numbers, the time required to update the display with a new number can become significant due to the number of clock pulses that must be generated and counted. For example, a four digit number requires a possible maximum of nearly 10,000 pulses.

Accordingly, it is a general object of this invention to provide a spray control system which improves the speed of the control system, both in terms of the time it takes to achieve and maintain a selected flow setpoint and the time it takes to obtain a new flow reading from the flow meter and update the display.

SUMMARY OF THE INVENTION

In accordance with the present invention, there is provided a spray control system and controller for applying a coating composition to an object. The control system includes an applicator, flow control valve, flow meter, and an electronic controller coupled to receive a measured flow value from the flow meter and to provide a valve control signal to the control valve. The electronic controller is operable to determine the valve control signal for the flow control valve using the flow value and a selected setpoint representing a desired flow, with the controller further being operable to associate the valve control signal with the selected setpoint and store the valve control signal in memory. In response to receiving a selected setpoint, the controller operates the flow control valve with the stored valve control signal associated with the selected setpoint and thereafter regulates the flow of coating composition by adjustment of the valve control signal. In this way, the controller learns the proper valve control signal for a particular setpoint and can then use that learned control signal to initially operate the control valve when the setpoint is selected. Then, once the flow of coating composition commences, the controller uses closed loop control to accurately regulate the flow at the setpoint.

Preferably, one or more process parameters are stored along with the learned valve control signal and these parameters are later monitored when the associated setpoint is used to control flow. If any parameter moves outside of a window or range of values about its stored value, then an alarm notification is provided. The particular parameters stored by the controller can be selected by the operator as a part of the initial setup of the control system.

The learning of an appropriate valve setting for a particular setpoint can be carried out as a part of a learn mode of operation in which the controller uses proportional or incremental control of the measured flow to determine the appropriate valve control signal. Preferably, the controller waits until the flow has sufficiently stabilized about the setpoint before storing the valve control signal and measured process parameters. This condition can be determined using one or more flow stabilization criteria that are monitored by the controller and used to trigger storage of the then-current valve control signal and measured process parameters. The controller can be used to continuously adapt to changing environmental and operating conditions by checking periodically to determine if the stabilization criteria have been met and, if so, by then storing the appropriate learned values. In this way, the controller continuously re-learns the valve control signal and monitored process parameters for the current setpoint.

In accordance with another aspect of the invention, there is provided a method of controlling the flow of a coating composition using a flow control valve that responds to a valve control signal to regulate the flow of coating composition. The method includes the steps of obtaining a setpoint representing a desired flow of a coating composition, iteratively monitoring the flow of the coating composition and adjusting the valve control signal until the flow of coating composition equals the desired flow, storing the adjusted valve control signal, operating the control valve with the valve control signal at commencement of coating composition flow, and regulating the flow of coating composition using closed loop control after commencement of the flow of coating composition.

BRIEF DESCRIPTION OF THE DRAWINGS

A preferred exemplary embodiment of the present invention will hereinafter be described in conjunction with the appended drawings, wherein like designations denote like elements, and:

FIG. 1 is a block diagram of a preferred embodiment of a flow control system of the present invention as it would be used in a spray paint application;

DESCRIPTION OF THE PREFERRED EMBODIMENT

Figure 2A:
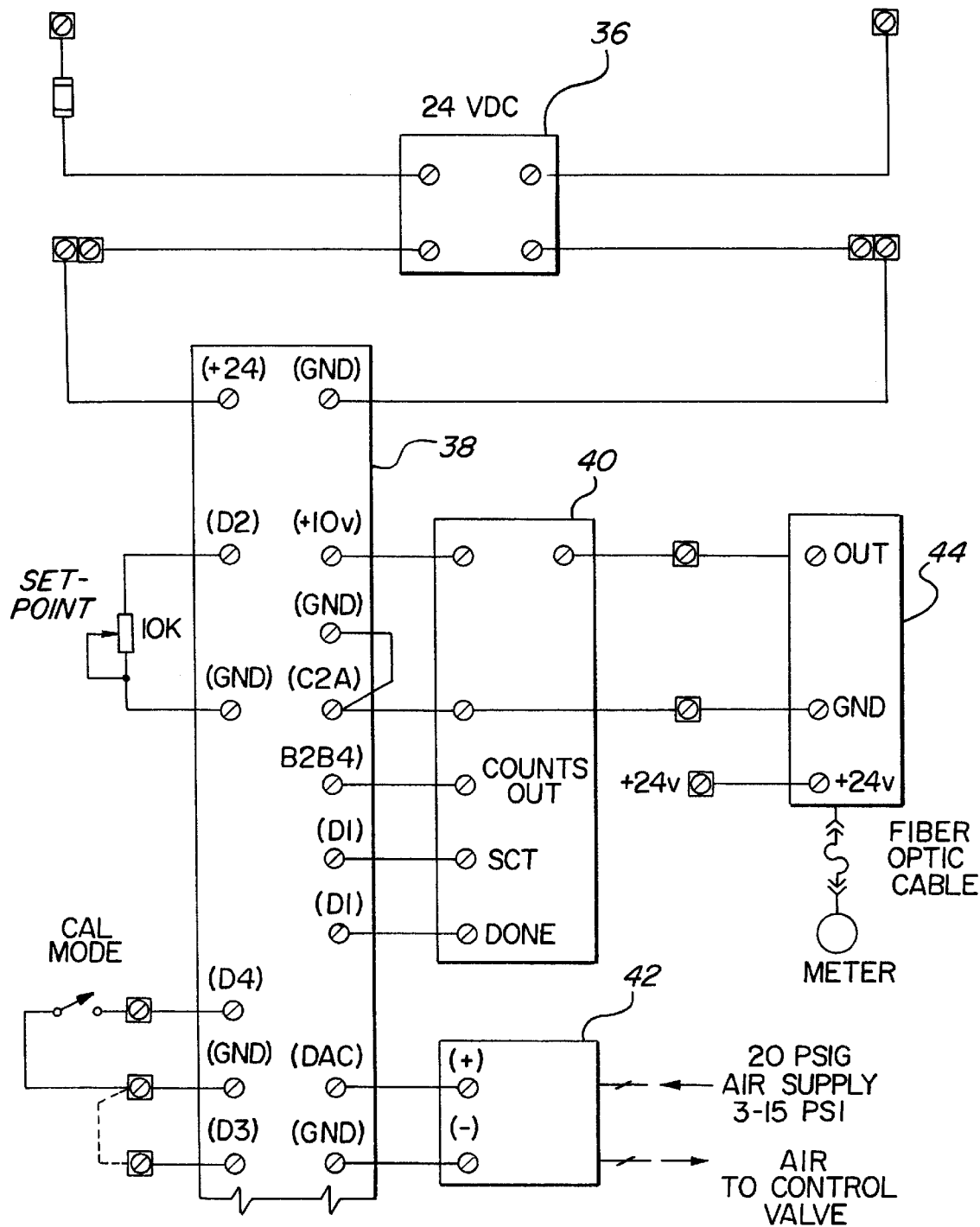
FIG. 2 is a block diagram of the controller of FIG. 1, showing the interconnections between the various modules that make up the controller.

Referring to FIG. 1, there is shown a flow control system 10 of the present invention as it might be used in a paint spray control system. It will of course be appreciated that the invention can be used in any of a number of different applications involving the spraying of a coating composition, whether that composition be a pigmented composition such as a paint or primer, or a resinous composition such as an acrylic, epoxy, urethane, alkyd, polyester, or other such material. Flow control system 10 includes a controller 12, paint reservoir or pot 14, flow meter 16, flow control valve 18, spray gun 20, and a number of sensors for measuring various environmental and operating (process) parameters. The sensors include a temperature sensor 22 for measuring ambient air temperature, a pot pressure sensor 24 for measuring the air pressure in pot 14, a pilot trigger pressure sensor 26 for detecting activation of spray gun 20, a fan air pressure sensor 28 for applications using fan air to control the paint cloud shape, and an atomizing air pressure sensor 30 for measuring the pressure of the atomizing air used to produce the spray of paint by spray gun 20.

In general, operation of control system 10 is as follows. The operator selects a setpoint representing a desired flow rate and then places controller 12 in either a learn mode or an automatic mode. The learn mode is used by controller 12 to determine the magnitude of the valve control signal needed by flow control valve 18 to provide a flow rate equal to the selected setpoint. Once determined for a particular setpoint, the learned valve control signal is stored and is used during subsequent spray applications whenever the associated setpoint is selected. The automatic mode is the normal operating mode that is used to provide a regulated flow of paint at a selected setpoint. In either mode, upon activation of the spray gun trigger, paint from pot 14 is forced through the nozzle 32 of spray gun 20 due to the pressurization of pot 14 by the pressurized pot air. The flow rate of the paint is controlled by flow control valve 18 and is measured using flow meter 16. The measured flow rate is provided as feedback to controller 12 and is compared to the selected setpoint. Control valve 18 is then adjusted until the measured flow equals the setpoint. If the controller is in the automatic mode and at a setpoint that has previously been learned, then the stored valve control signal associated with that setpoint is initially used to set control valve 18. Thereafter, the measured flow rate is used to provide closed loop regulation of the flow rate about the selected setpoint once spray gun 20 is triggered and paint flow is detected by controller 12.

Figure 2B:
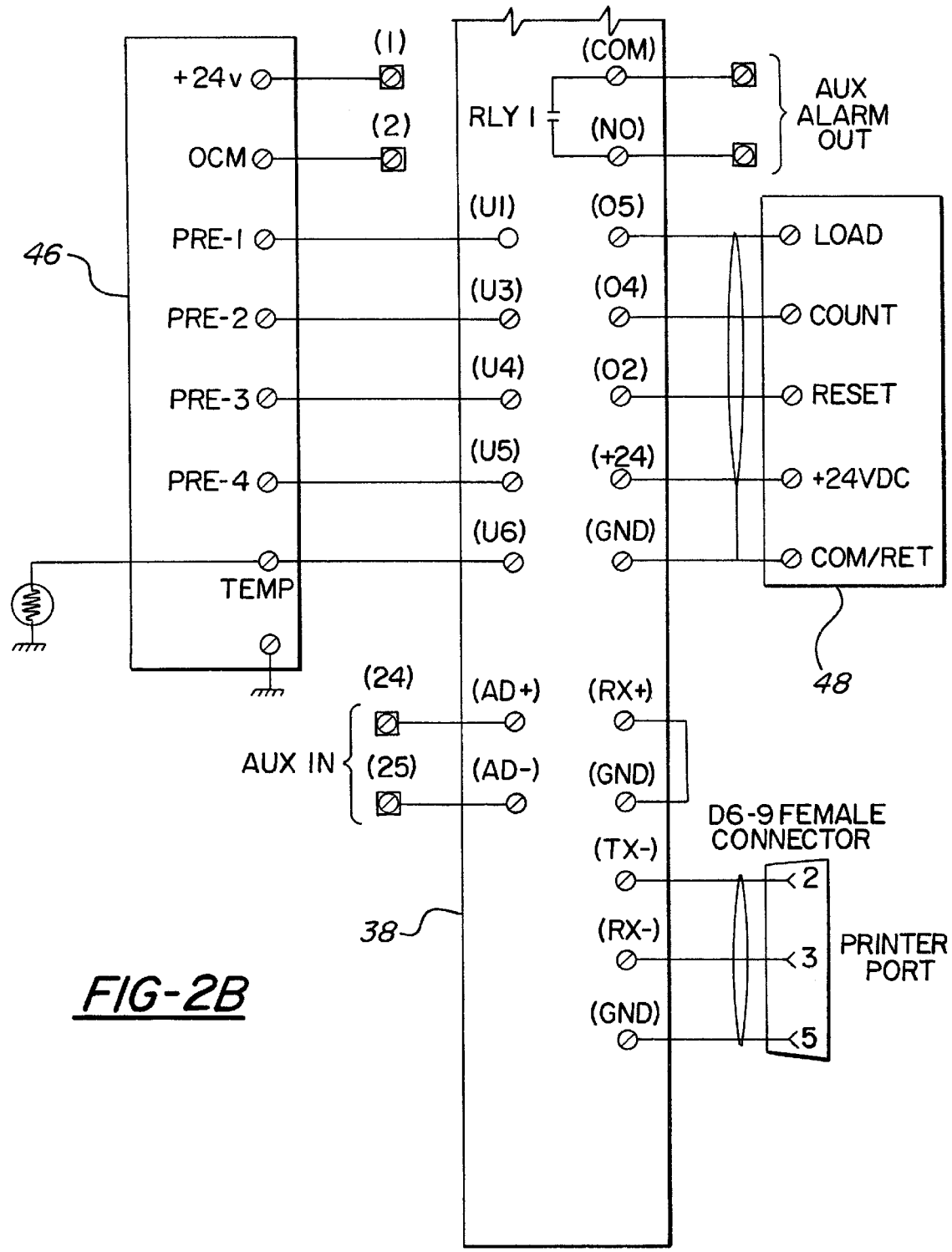

Referring now to FIG. 2, there is shown a block diagram of controller 12 depicting the various modules or pc boards that together constitute controller 12. In particular, controller 12 includes a power supply 36, a computer board 38, a pulse timing board 40, a electro-pneumatic converter 42, a fiber optic receiver 44, a sensor board 46, and a display board 48. Computer board 38 is a microprocessor-based circuit that includes a control program stored in non-volatile memory on the board. The microprocessor operates under control of the program to process operator and sensor inputs and to provide an output control signal that is used to drive control valve 18 via electro-pneumatic converter 42. Computer board 38 can be a commercially available computer board such as the PK2100 (Part No. 101-0244, manufactured by Z-World Engineering of Davis, Calif.) to which is added an additional 128K of RAM to provide sufficient memory capacity.

Pulse timing board 40 receives pulses from flow meter 16 by way of fiber optic receiver 44 and provides computer board 38 with a count indicative of the period between successive pulses from flow meter 16. This count is used by the microprocessor-based circuit 38 to determine a flow value indicative of the flow rate so that it may be compared to the setpoint and thereby used to precisely regulate the flow rate. As will be discussed further below in connection with FIG. 3, this technique enables controller 12 to quickly determine and display the flow rate. Electro-pneumatic converter 42 can be a commercially-available converter that receives a pressurized air supply (e.g., 20 psig) and an analog output control signal from computer board 38 and provides a pneumatic output signal at a pressure based upon the level of the output signal. This pneumatic signal is provided to control valve 18 to regulate the flow of paint through the valve. Fiber optic receiver 44 can be a commercially available device that converts optical signals from flow meter 16 into a pulse train that is provided to pulse timing board 40.

Sensor board 46 contains the pressure sensors 24, 26, 28, 30 used to measure the various pressures monitored by the controller of FIG. 1. It also connects to temperature sensor 22 which comprises a thermistor that is mounted off the board and that is used to determine ambient temperature. In addition to or in lieu of the pressure sensors, sensor board 46 can be used to input other measured parameters that the operator wishes to have monitored during the spraying process. Display board 48 contains four, seven-segment LED displays that are used to display the measured flow rate using a circuit that will be described below in conjunction with FIG. 4. Finally, computer board 38 can include an auxiliary alarm output that can be used to audibly or visually alert the operator of an alarm condition, as well as a printer port that can be used for logging of alarm conditions and other events.

Figure 3:
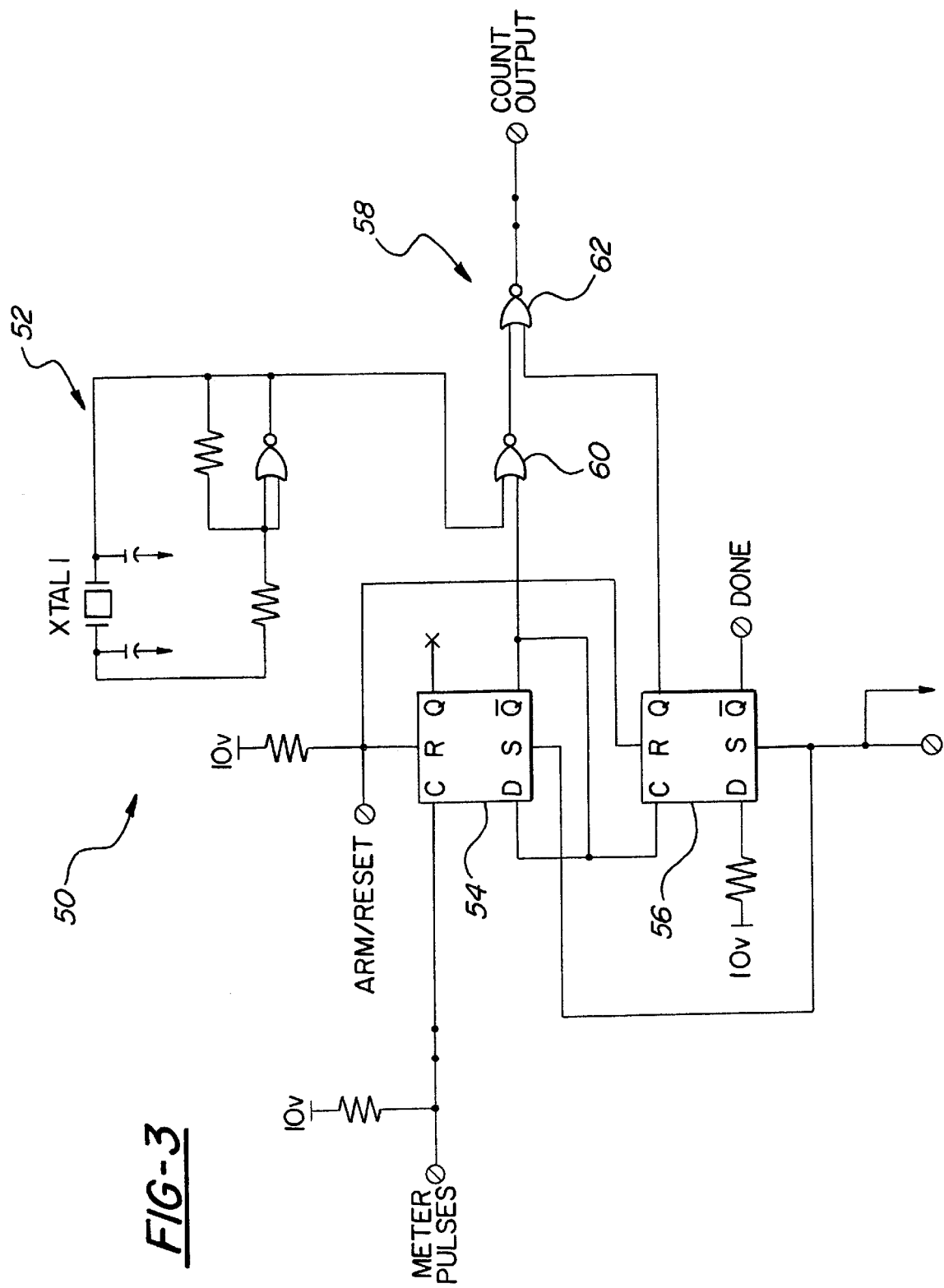
FIG. 3 is a schematic of the pulse timing board of FIG. 2.

Referring now to FIG. 3, the circuitry 50 of pulse timing board 40 will now be described. As mentioned above, timing board 40 receives pulses that originate at flow meter 16. As is known, the rate of these meter pulses is indicative of the flow rate of paint through the system. Pulse timing circuit 50 is used to determine the period between pulses (and, hence, the flow rate) by starting a pulse generator 52 at the beginning of one meter pulse and stopping it at the beginning of the next successive meter pulse, with the microprocessor of circuit 38 being used to count the number of clock pulses produced by the pulse generator during this time. In particular, pulse timing circuit 50 includes pulse generator 52, a pair of D-type flip-flops 54, 56, and a gated output section 58. Pulse generator 52 produces a 200 kHz pulse train that is connected to one input of a two-input NOR gate 60 that is within output section 58. This signal is gated using the inverted Q output of flip-flop 54. The output of NOR gate 60 is supplied as one input of a second two-input NOR gate 62 within output section 58. This signal is then gated using the non-inverted Q output of flip-flop 56 and the output of NOR gate 62 is connected to circuit 38 so that the clock pulses can be counted by the microprocessor. The D-input of flip-flop 54 is connected to its inverted Q output so that the outputs of flip-flop 54 will simply toggle between logical zero and logical one as a result of each clock input. This inverted Q output is also connected as the clock input of flip-flop 56 so that when this inverted Q output switches from a logical zero to a logical one, the data on the D-input (a logical one) of this flip-flop will be clocked through to its output.

At the beginning of a pulse measurement cycle an arm/reset signal is generated by the microprocessor and is used to reset the non-inverted outputs of flip-flops 54, 56. Consequently, the inverted Q output of flip-flop 54 is at a logical one level, which inhibits the 200 kHz pulse train from passing through NOR gate 60. Once armed, the leading edge of the next successive meter pulse causes the inverted Q output of flip-flop 54 to toggle to a logical zero, which permits the 200 kHz pulse train to pass through NOR gate 60. Since flip flop 56 has not yet clocked through the logical one contained on its data input, the non-inverted output is at a logical zero which permits the pulse train to pass through NOR gate 62, as well. These clock pulses are counted by the microprocessor's hardware accumulator until the occurrence of the leading edge of the next successive meter pulse. This leading edge causes flip flop 54 to clock through the logical zero at its D-input, thereby resulting in its inverted Q output changing from a logical zero to a logical one. This transition causes flip flop 56 to clock through the logical one connected to its D-input, thereby resulting in a logical one at the second input of NOR gate 62 which stops the 200 kHz pulse train from passing through. The inverted Q output of flip flop 56 provides an active low DONE signal which provides an indication to the microprocessor that the pulse measurement cycle is over and the received count can be used as the measured flow rate. As will be appreciated, by determining the period between two meter pulses in this fashion, the circuit can determine the flow rate within two pulses of the spray gun being triggered on.

Figure 4:
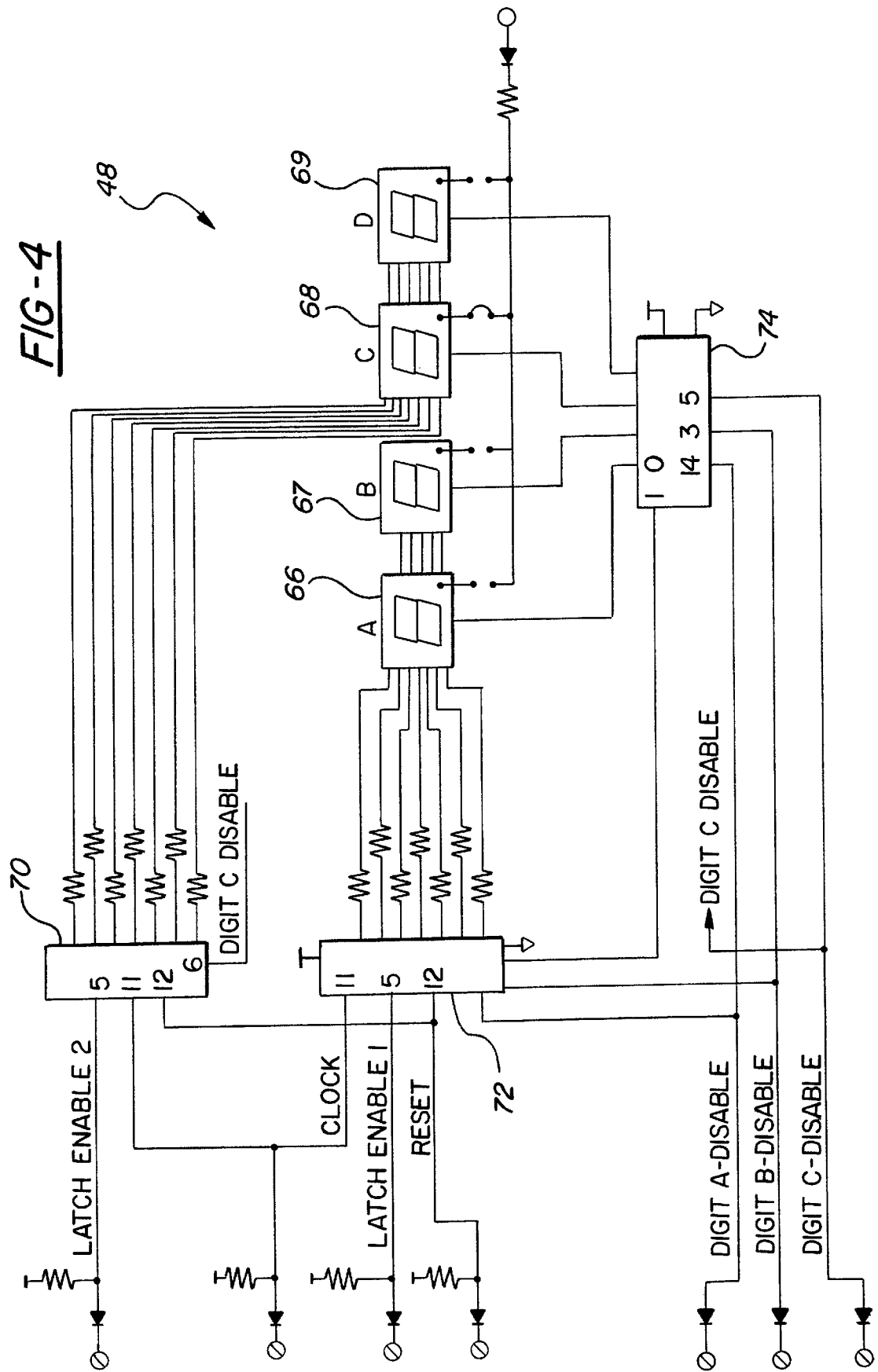
FIG. 4 is a schematic of the display board of FIG. 2.

Referring now to FIG. 4, display board 48 includes four, seven-segment LEDs 66–69, a pair of 74C925 drivers 70 and 72, and a 75492 chip enable 74. The LEDs are grouped in pairs, with LEDs 66, 67 of the first pair being connected to driver 72 and LEDs 68, 69 of the second pair being connected to driver 70. Chip enable 74 is connected to each of the four LEDs and is used in a conventional manner to latch the segment data into the displays and to disable any of the first three LEDs 66–68 that represent leading zeros for the number being displayed. As is known, drivers 70, 72 determine which segments to illuminate in each of their associated LEDs in accordance with the count (i.e., number of clock pulses) received by the drivers. By providing a separate driver for each pair of LEDs, rather than a single driver for all four LEDs, the number of clock pulses needed to arrive at the desired number to be displayed can be significantly reduced.

More specifically, where a single driver is used for all four LEDs, it would require 7,322 clock pulses in order to be able to display the number 7,322. However, by providing a separate driver for each pair of LEDs, the number to be displayed can be separated into pairs of digits, for which a count of no more than 99 is needed. Thus, to display 7,322, a total of only 73 clock pulses is needed, with LEDs 68, 69 being latched after only 22 clock pulses and LEDs 66, 67 being latched after all 73 clock pulses. This method of displaying numbers uses two orders of magnitude less time than is required by the conventional method that requires 7,322 clock pulses. Thus, large numbers can be displayed very quickly and in a manner in which the maximum possible display time is independent of the total number of digits in the number. Although the four digit number has been separated into two pairs in the illustrated embodiment, it will be appreciated that other arrangements are possible. For example, a six digit number could be broken down into three pairs or into two groups of three depending upon such factors as the cost of additional components and the how quickly the display must be updated for a particular application.

Figure 5:
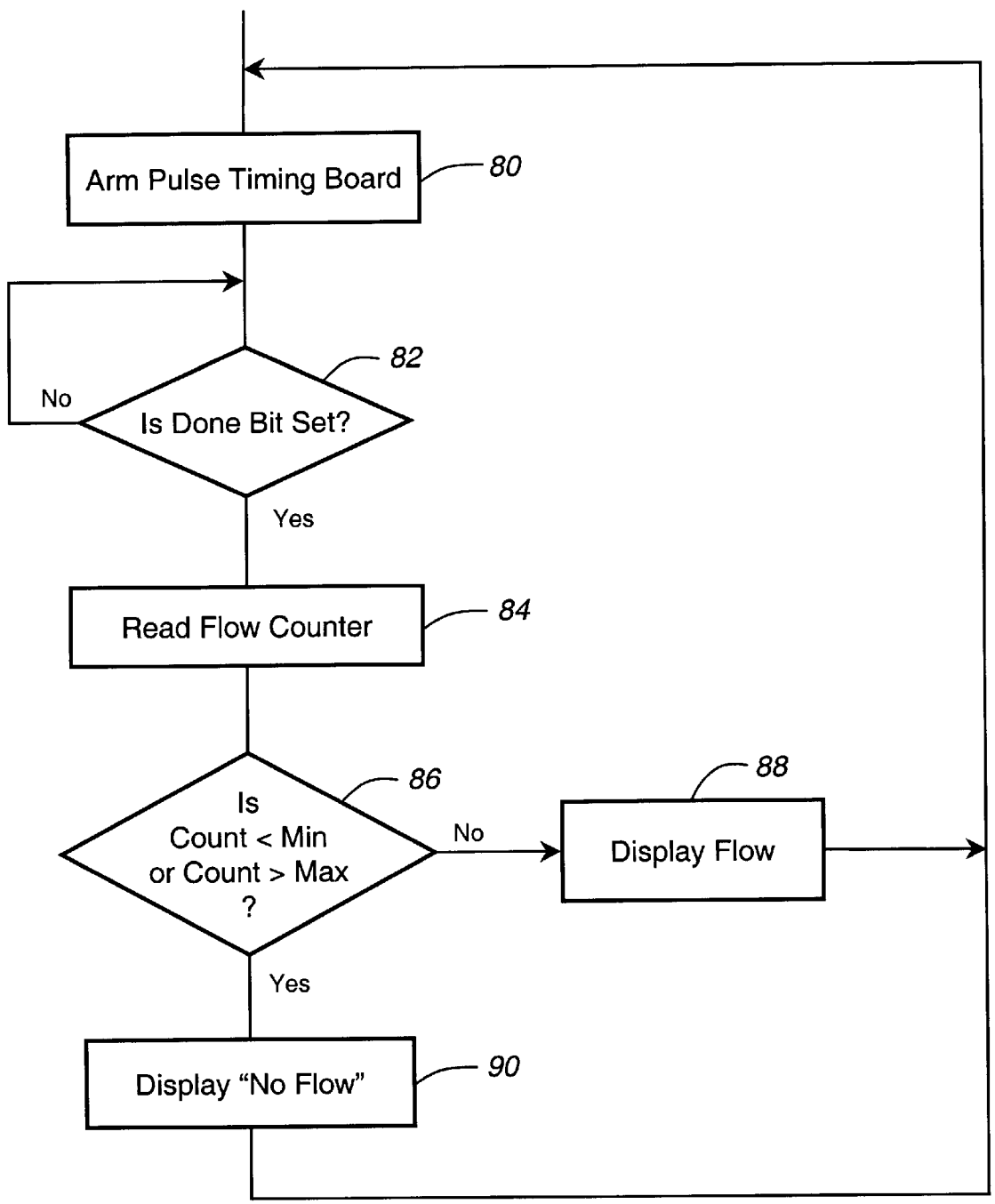
FIG. 5 is a flow chart depicting the process used by the control system of FIG. 1 to acquire and display the flow rate of paint to the spray gun.

Turning now to FIG. 5, there is depicted a method for acquiring and displaying the flow rate of paint to the spray gun. This process represents a portion of the control program used by microprocessor-based circuit 38 to determine the flow rate. The first step in this sequence is to arm pulse timing board 40, as indicated at block 80. This is accomplished by the microprocessor using the arm/reset input to timing board 40. The next step (block 82) is to wait until a completed pulse count has been received by the microprocessor, as will be indicated by the DONE bit from pulse timing circuit 50. Once the DONE bit is set, flow moves to block 84 where the final count is read by the microprocessor, and then to block 86 where a check is made to determine whether the received pulse count is between a pre-selected minimum and a pre-selected maximum. If the count is within range, flow moves to block 88 where the measured flow rate is displayed. If the count is outside the pre-selected range, flow moves to block 90 where the phrase "No flow" is displayed. In either event, the process returns to block 80 for another cycle.

Figure 6:
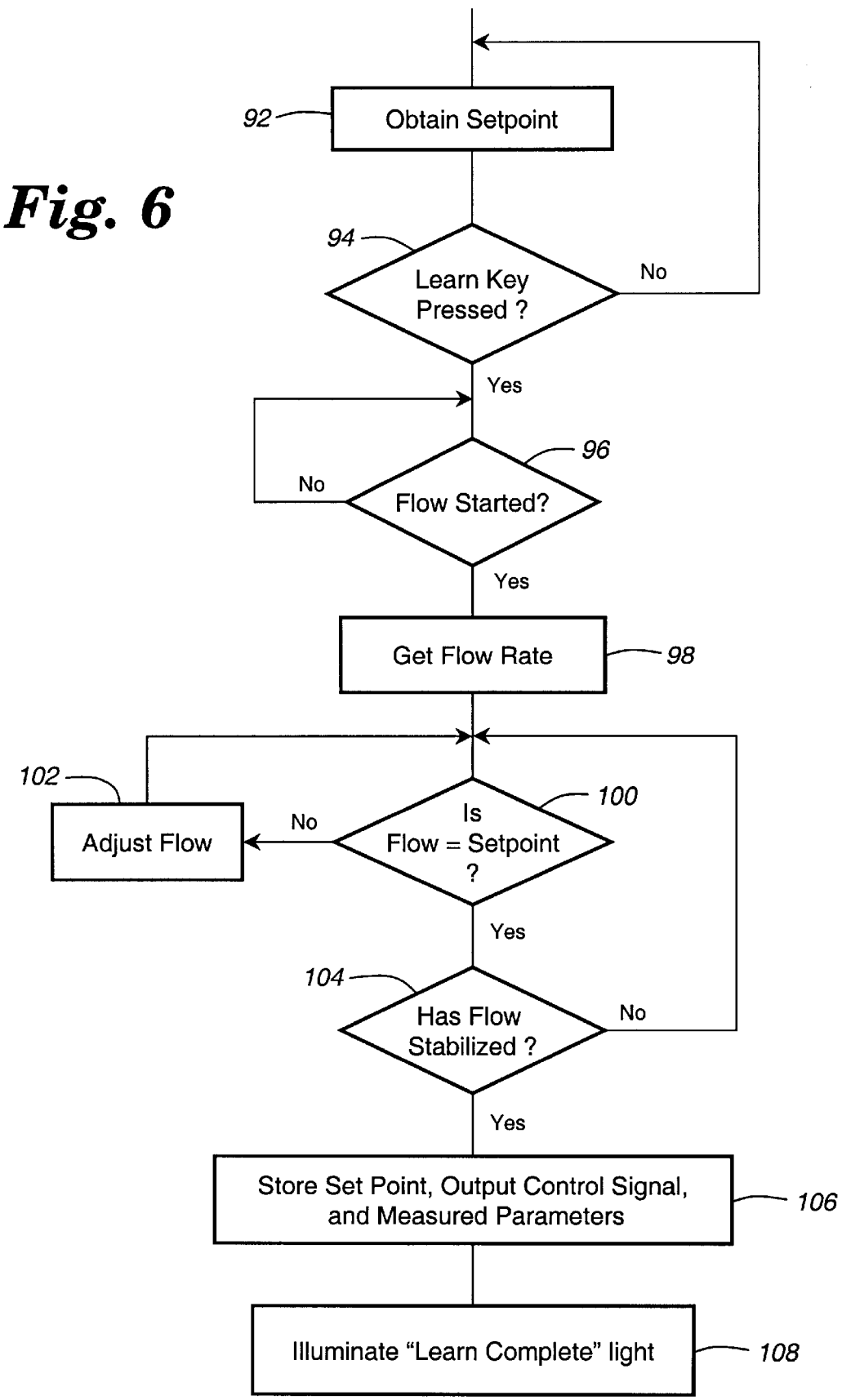
FIG. 6 is a flow chart depicting the learn mode process used by the control system of FIG. 1.

Referring now to FIG. 6, the learn mode process also represents a portion of the control program. The learn mode is used by the operator to provide controller 12 with a desired setpoint and to then permit controller 12 to determine what output signal to control valve 18 is needed to achieve the setpoint, as well as what the current values are of the various environmental and operational parameters of interest to the operator. The process begins at block 92 where the microprocessor acquires the user-selected setpoint. This setpoint can be entered using a potentiometer, as shown in FIG. 2. The next step (block 94) is to determine if the operator has pressed a learn mode key on the controller indicating that the operator wishes to enter the learn mode. If not, flow returns to block 92. If the key has been pressed, flow moves to block 96 where a check is made to determine if the flow of paint has been started. This is done simply by looking at the count received from pulse timing board 40. If it is below the pre-selected minimum count, then a No Flow condition is assumed. Once flow has started, the process moves to block 98 where the measured flow is determined in the manner described above. Then, at block 100, a check is made to determine if the flow is equal to the setpoint. If not, the flow is adjusted by adjusting the valve control signal provided to valve 18, as indicated in block 102. The valve control signal can be adjusted in accordance with the difference between the setpoint and the measured flow rate (e.g., on a proportional basis) or can be adjusted incrementally using a step size that is specified either by the user or in the controller software. Moreover, if desired, a number of windows, or ranges, can be specified about the setpoint and the step size of the increment can be different in the different windows. Thus, for example, if the measured flow is within 100 units of the setpoint, the step size can be one value and, if within 50 units of the setpoint, can be another, smaller, step size. Alternatively, both proportional and incremental control can be used, with proportional control being used when the difference between the setpoint and measured flow is greater than a predetermined value and incremental control being used otherwise.

Once the flow is equal to the setpoint (i.e., once the measured flow falls within a small deadband range that includes and is preferably centered on the setpoint), the process moves to block 104 to determine if the flow has sufficiently stabilized. Controller 12 determines this using a flow stabilization criterion that can be configured by the operator. Preferably, the criterion is defined as a number of consecutive iterations of the software flow control loop in which the measured flow falls within the deadband range about the setpoint. Thus, for example, if the measured flow is within the deadband range for three successive iterations of the control loop, then the criterion is met and flow moves to block 106; otherwise, the process returns to block 100 to again check whether the measured flow equals the setpoint. At block 106 the setpoint, output control signal, and measured process parameters (ambient temperature, pot pressure, atomized air pressure, etc.) are stored. These stored parameter values are used in connection with the automatic flow control process that is described below in connection with FIG. 7. The final step (block 108) is to illuminate a learn complete light located on the front panel of controller 12.

Figure 7A:
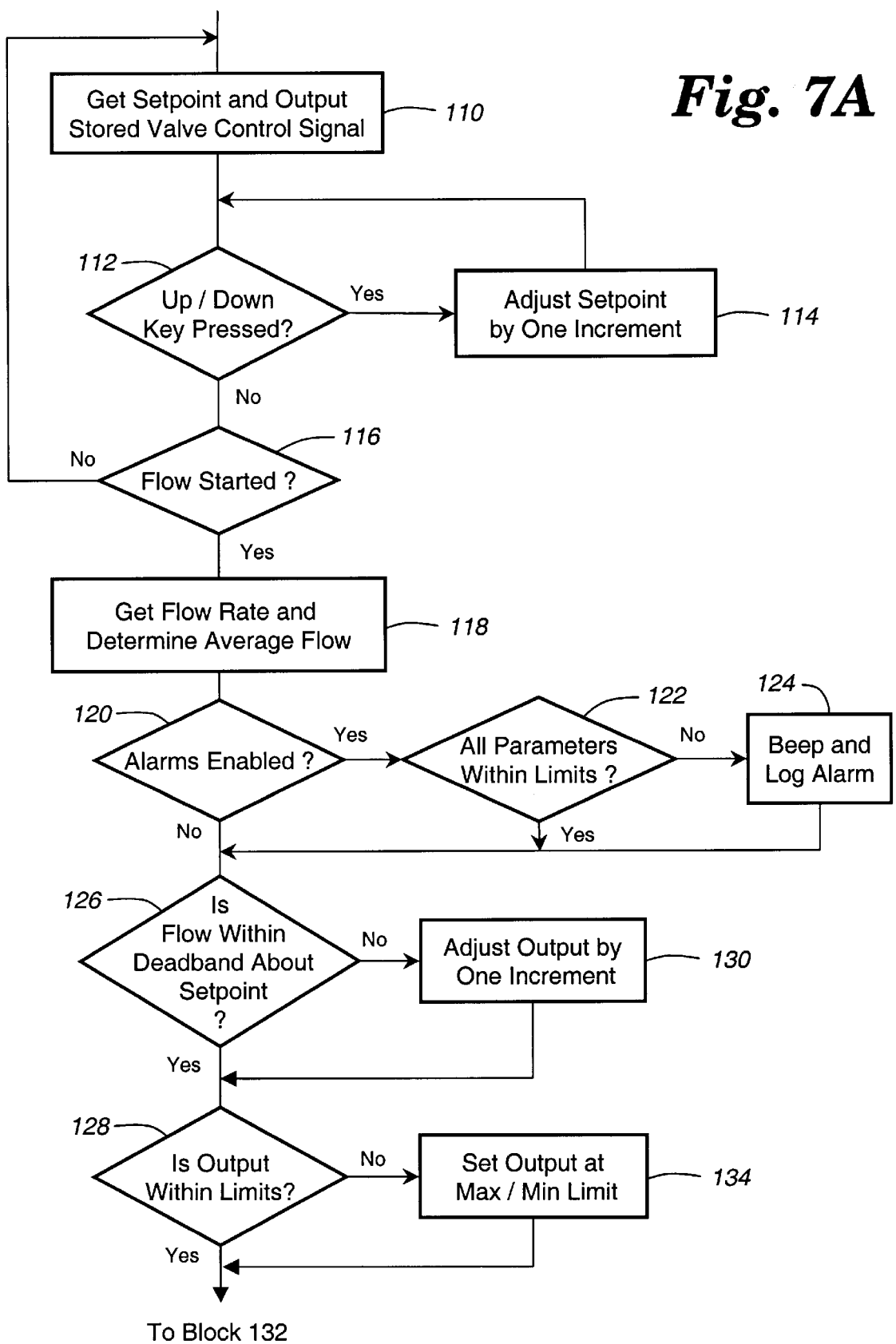
FIGS. 7A and 7B together comprise a flow chart depicting the automatic flow control process used by the control system of FIG. 1 to regulate the flow of paint to the spray gun.
Figure 7B:
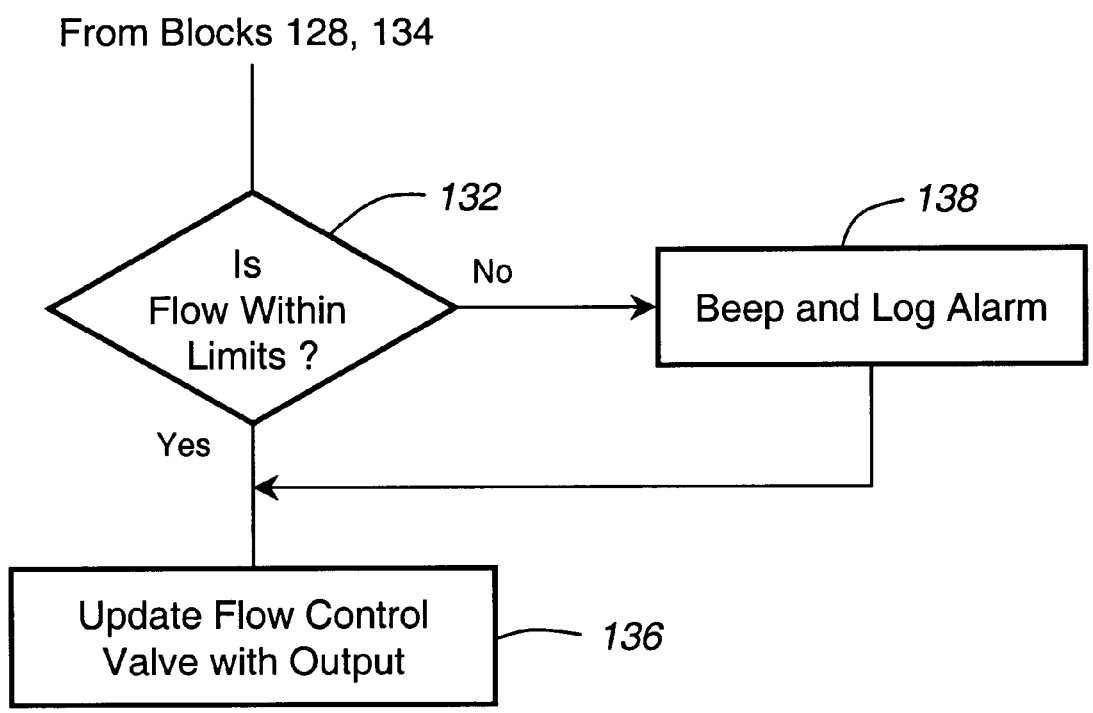

Referring now to FIGS. 7A and 7B, the automatic flow control process, or automatic mode, used to regulate the flow rate will now be described. As with the other processes described above, the automatic control process is implemented through software stored on computer board 38. The first step is to get the flow setpoint, as indicated at block 110. Typically, this setpoint is manually selected by the operator as a part of the learn mode, although it can be manually dialed in without using the learn mode or can be obtained from a preset profile, as will be discussed further below. Where the setpoint has previously been learned, the stored valve control signal associated with the selected setpoint is outputted by the controller to the control valve. This control signal is maintained until flow is detected using the flow meter, at which point closed loop regulation of the flow is instituted. However, prior to or along with monitoring for paint flow, a check is made at block 112 to determine if the operator is making fine adjustments to the setpoint. Up/Down keys on a front panel of the controller can be provided to permit these fine adjustments. If either key is pressed, then the process moves to block 114 where the setpoint is adjusted by one increment. This process repeats until the operator has finished adjusting the setpoint. Flow then moves to block 116 where a check is made to determine whether paint flow has started. If not, the process returns to block 110.

If flow has begun, then closed loop control is begun and the process moves to block 118 where the flow rate is acquired and averaged. This averaging can be accomplished by storing a number of successive flow rates, eliminating the two extreme flow rates (i.e., the highest and lowest flow rates), and then averaging the remaining flow rates. The process then moves to block 120 where a check is made to determine if the operator has enabled the alarm functions. If not, then the process moves to block 126. If so, then controller 12 will monitor the various environmental and operational parameters previously selected by the operator and will alert the operator with an alarm if any of the parameters drift outside of a predetermined window, or range, around the stored parameter values of the parameters. Normally, these parameter values are determined and stored during the learn mode for a learned setpoint, although both the window size and the parameter values themselves can be set by the operator as a part of the controller setup. Thus, flow moves to block 122 where controller 12 checks to determine whether all of the monitored parameters are within their associated limits. If so, flow moves to block 126. If at least one parameter is outside its associated window, an alarm is sounded and the alarm condition is logged to an attached printer, as indicated at block 124. Flow then moves to block 126.

At block 126 a check is made to determine if the flow is within a deadband about the setpoint. This deadband is a small range that can be set by the operator to prevent the controller from adjusting the flow when it varies only insignificantly from the setpoint. This helps avoid oscillation of the actual flow rate about the setpoint. If the flow is within the deadband range, then the process moves to block 128. If the flow is outside of the deadband, then the process moves to block 130 where the output signal to control valve 18 is adjusted up or down by one increment. The actual size of these step increments can be predetermined and can be selected or modified by the operator as a part of the initial setup of controller 12. The process then moves to block 128, where the output signal is checked to determine whether it is within predetermined minimum and maximum limits. If so, process flow moves to block 132. If not, process flow moves to block 134 where the output is held at its minimum or maximum permissible value. In this way, the output signal is clamped at one of its two limits anytime the automatic flow control process attempts to take it outside those limits. At block 132 a check is made to determine if the measured flow rate itself is within the limits set during initial configuration of the controller. If so, flow moves to block 136. If not, flow moves to block 138 where an alarm is sounded and the alarm condition logged to the attached printer. Flow then moves to block 136 where control valve 18 is updated using the new output control signal. This process then repeats as long as the flow of paint continues.

As will be appreciated by those skilled in the art, the use of learned setpoints along with closed loop control allows the system to quickly achieve and maintain the desired flow, since the control valve is initially driven to a pre-learned position and then is adjusted as needed to maintain the setpoint once flow has begun. Thus, when flow first begins, the system does not have to start from one extreme flow condition and then ramp up or down to the setpoint flow, as typically occurs with conventional controllers that rely on error between the setpoint and measured flow. Rather, it starts immediately at or very near the desired flow, with the flow being trimmed once the flow is detected and fed back to the controller. If desired, a short (fraction of a second) delay can be programmed into the controller to prevent commencement of the regulation of the flow until a short time after the gun is triggered. This gives the flow sufficient time to reach a value near setpoint before closed loop regulation is begun.

Furthermore, by providing this incremental control of flow rate along with alarms in the event of user-selected parameters drifting outside of their associated permissible ranges, good stable control of the flow rate can be achieved. Also, as indicated by the broken lines in FIG. 1, the various pressure sensor inputs are optional and it is up to the operator's discretion to determine what sensors are to be used and what permissible ranges to associate with each sensor. To provide this flexibility, controller 12 includes these sensor inputs using industry-standard input conventions (e.g., 4–20 mA inputs) so that any of a number of different types of sensors can be connected to controller 12 and monitored. Thus, the operator can use any of a number of different sensors (e.g., temperature, pot pressure, atomization pressure, humidity, barometric pressure, etc.) without the manufacturer of controller 12 needing to know in advance what sensors will be utilized. This is advantageous for companies that use such paint controllers since they often do not want to disclose what types of environmental and operational parameters they have found to be important in obtaining good results.

Often, different flow rates are needed for different coating operations or for different areas of a single object. To accommodate these multiple flow rates, the controller can be configured with a number of preset zones or profiles that can be selected either between spraying applications or on the fly while the gun is triggered on. Each profile includes a learned setpoint along with its associated valve control signal and stored process parameter values. Then, when a zone or profile is selected, its stored valve control signal is used to initially set the valve position, with its setpoint then being used for closed loop control of the flow and the stored parameter values being used to provide alarm notifications, if desired. The profiles can be selected locally using a switch on the controller, remotely via a communications link to an attached computer, or through software running on the controller itself.

In addition to using the learn mode key to manually enter the learn mode, the automatic mode uses the learn mode to continuously re-learn the setpoint. This allows the controller to adapt over time to changes that would otherwise obsolete the original stored valve control signal and associated parameters. This also allows the controller to automatically learn a setpoint that is manually dialed-in by the operator who does not bother to press the learn mode key and learn the selected setpoint. In particular, when a new setpoint is entered using the potentiometer or up/down buttons, the controller uses the incremental or proportional control discussed above to regulate the flow at the setpoint. Once the flow stabilization criterion used by the learn mode is met (i.e., once the flow has sufficiently stabilized at the setpoint), the setpoint is considered learned and the associated valve control signal and current process parameter values are then stored. By storing these new values each time the criterion is met, the controller continuously adapts to any changes that influence the accuracy of the stored valve control signal for the associated setpoint. The system will therefor provide an accurate instantaneous flow each time the gun is triggered. Moreover, this arrangement eliminates the need for the learn mode key altogether, since any selected setpoint can be manually dialed-in and the controller will learn the valve control signal needed for that setpoint and then use that control signal the next time the gun is triggered or the setpoint is selected.

As is known in controllers that permit the setpoint to be selected both manually (using, e.g., a potentiometer) and automatically (via software), when switching from automatic control (in which the software is generating the valve control signal) to manual control (in which the potentiometer is providing the setpoint from which the control signal is derived), there is typically a bump in the flow rate due to the jump in valve control signal to the value dictated by the current potentiometer setting. To provide bumpless operation, the controller can use the up/down buttons in lieu of the potentiometer to manually change and select the setpoint. Then, when switching to manual selection of the setpoint, the setpoint is initially taken at its current value in software rather than derived from the current potentiometer position. This not only eliminates the need for the potentiometer, but also provides bumpless transition to a new setpoint since there is no discontinuous jump in the setpoint (and, thus in the valve control signal) when manually adjusting the setpoint.

By monitoring pilot trigger pressure sensor 26, a no flow condition due to a clogged spray gun can be detected. Each time that a check is made for flow, as in block 106, and it is determined that no flow exists, pressure sensor 26 can then be checked to determine whether the spray gun has been triggered on. If so, then the absence of any paint flow indicates that the system is clogged and the operator can then be alerted.

In applications involved vertical movement of the spray gun, the flow can be regulated to account for the effects of changing pressure as the gun is raised and lowered. This is accomplished using yet another pressure sensor. Rather than attaching the pressure sensor to the gun itself, the pressure sensor can be located outside the spray booth or spray area with a tube used to provide the pressure signal from the gun to the sensor. The tube can be filled with de-ionized water as a medium for transmitting the pressure changes from the hazardous environment to the safer environment where the circuitry is located. The flow rate can then be adjusted up or down as necessary to account for changes in pressure due to the vertical movement of the spray gun.

In spray applications where the spray gun is moved along one or more axes by, for example, robotic control, the quality of the spray or coating process is often affected by changes in speed of the spray head. To account for this affect, a single or multi-axis accelerometer can be mounted on the spray gun so that controller 12 can monitor the acceleration of the spray gun and either can alarm the operator of the occurrence of undesirable accelerations or can actually vary the flow to counteract for the affect of changes in speed. As shown in FIG. 1, such an accelerometer 140 includes an rf transmitter 142 that, along with accelerometer 140, is packaged in an explosion-proof container 144. Transmitter 142 communicates with a receiver 146 that is a part of controller 12.

Adjustment of the flow rate due to either vertical movement or acceleration of the spray gun as described above can be implemented using the automatic flow control process described above. That is, the output can be adjusted automatically to account for vertical movement or changes in acceleration. Alternatively, adjustment of the flow rate can be implemented using proportional or other type of control, if desired.

As will be appreciated by those skilled in the art, controller 12 can be incorporated into or used in conjunction with a conventional spray application machine, such as an Application Machine APL 2.0, produced by Köhne GmbH.

Flow meter 16 can be a mass flow meter, such as an LCMASS™ made by Rheonik Meβgeräte GmbH. Flow control valve 18 can be a conventional pressure regulator that balances its input and output using the valve control signal. Alternatively, flow control valve 18 can be a valve of the type that does not utilize differential pressure in setting its position, but rather sets itself at a position determined by the valve control signal, irrespective of whether the spray gun is triggered and there is flow through the valve. These valves can provide a near immediate flow rate at the desired setpoint upon triggering of the spray gun since they do not have to move from a full open position to the selected position after flow has begun.

It will thus be apparent that there has been provided in accordance with the present invention a flow control system which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, although the illustrated embodiment is directed to the use of flow control system 10 for a paint spraying application, it will be appreciated that control system 10 can be used for any of a number of other coating applications involving regulation of a spray of liquid coating composition. Also, although the flow rate is controlled using control valve 18, it will be appreciated that flow rate could be regulated by controlling the level of pressurization of pot 14. All such variations and modifications are intended to come within the scope of the appended claims.

We claim:

1. A spray control system for applying a coating composition to an object, comprising:

an applicator having a nozzle and being coupled to receive a liquid coating composition under pressure;

a flow control valve connected in-line with said applicator, said flow control valve having an input and being operable to control the flow of coating composition to said applicator in accordance with a control signal on said input;

a flow meter connected in-line with said flow control valve and said applicator, said flow meter being operable to output a flow value indicative of the magnitude of the flow of coating composition to said applicator; and an electronic controller having an input connected to receive the outputted flow value from said flow meter and having an output connected to provide the control signal to said input of said flow control valve, said electronic controller being operable to determine a valve control signal for said flow control valve using the flow value and a selected setpoint representing a desired flow, said controller further being operable to associate the valve control signal with the selected setpoint and store the valve control signal in memory;

wherein said controller further comprises at least one other input connected to receive a user-specified setpoint, with said controller being operable in response to receiving the selected setpoint to provide said flow control valve with the stored valve control signal associated with the selected setpoint and to thereafter regulate the flow of coating composition by adjustment of the valve control signal.

2. A spray control system as defined in claim 1, wherein said controller is operable to determine whether one or more flow stabilization criteria have been met and is operable to store the valve control signal after said criteria have been met.

3. A spray control system as defined in claim 2, wherein said controller is operable to iteratively compare the flow value to the selected setpoint and is operable to determine that said criteria have been met when the flow value equals the selected setpoint during a pre-selected number of consecutive iterations by said controller.

4. A spray control system as defined in claim 3, wherein said controller is operable to determine that the flow value equals the selected setpoint when the flow value is within a range of values that includes the selected setpoint.

5. A spray control system as defined in claim 2, wherein said controller is operable to replace the stored valve control signal in memory with an updated valve control signal whenever said flow stabilization criteria are met.

6. A spray control system as defined in claim 1, wherein said controller is operable to determine whether there is a flow of coating composition to said applicator using the flow value and wherein said controller is operable to regulate the flow of coating composition only after said controller has determined that the coating composition is flowing to said applicator.

7. A spray control system as defined in claim 6, wherein said applicator includes a pilot trigger input and said spray control system further includes a trigger pressure sensor coupled to said controller and to said pilot trigger input to provide said controller with a trigger signal indicative of the presence of a pressure control signal at said pilot trigger input, wherein said controller is operable to provide an alarm notification in response to receiving the trigger signal when the flow value indicates that coating composition is not flowing to said applicator.

8. A spray control system as defined in claim 1, wherein said applicator comprises a spray gun.

9. A spray control system as defined in claim 1, wherein said controller is operable to store a parameter value representing a process parameter that is not controlled by said controller, and wherein said controller is operable to thereafter monitor the process parameter and provide an alarm notification if the monitored process parameter moves outside of a range of values that includes the stored value of the process parameter.

10. A spray control system as defined in claim 9, further comprising a vessel adapted to contain a supply of the coating composition under pressure, said spray control system further including a pot pressure sensor coupled between said vessel and said controller to provide said controller with a signal indicative of the pressure within said vessel, wherein said controller is operable to monitor the pressure within said vessel using said pot pressure sensor and to use the pressure within the vessel as the process parameter.

11. A spray control system as defined in claim 9, further comprising an temperature sensor coupled to said controller to provide said controller with a signal indicative of ambient air temperature, wherein said controller is operable to monitor the ambient air temperature using said temperature sensor and to use the ambient air temperature as the process parameter.

12. A spray control system as defined in claim 1, wherein said controller is operable to incrementally adjust the valve control signal by a pre-selected amount when the flow value is outside of a first range of values that includes the selected setpoint.

13. A spray control system as defined in claim 12, wherein, when the flow value is outside of a second range of values that is greater than said first range of values, said controller is operable to adjust the valve control signal by an amount that varies in accordance with the difference between the flow value and the selected setpoint.

14. A controller for use in a spray control system having a spray applicator, a flow control valve for regulating the flow of a coating composition to the applicator in response to a valve control signal, and a flow meter for providing a flow value indicative of the magnitude of flow of the coating composition, the controller comprising:

an electronic circuit having an input for connection to the flow meter and an output for connection to the flow control valve, said electronic circuit being operable to determine a valve control signal for the flow control valve using the flow value and a selected setpoint representing a desired flow, said circuit further being operable to associate the valve control signal with the selected setpoint and store the valve control signal in memory;

wherein said circuit further comprises at least one other input connected to receive a user-specified setpoint, with said circuit being operable in response to receiving the selected setpoint to provide the flow control valve with the stored valve control signal associated with the selected setpoint and to thereafter regulate the flow of coating composition by adjustment of the valve control signal.

15. A controller as defined in claim 14, wherein said circuit is operable to determine whether one or more flow stabilization criteria have been met and is operable to store the valve control signal after said criteria have been met.

16. A controller as defined in claim 15, wherein said circuit is operable to replace the stored valve control signal in memory with an updated valve control signal whenever one or more flow stabilization criteria are met.

17. A controller as defined in claim 14, wherein said circuit is operable to store a plurality of user-selectable profiles, each of which includes a setpoint and an associated valve control signal, and wherein said circuit is operable upon selection of one of said profiles to operate the control valve with the valve control signal for the selected profile and, after commencement of flow of the coating composition, said circuit is operable to provide closed loop regulation of the flow of coating composition at the setpoint associated with the selected profile.

18. A controller as defined in claim 14, wherein said circuit is operable to determine whether there is a flow of coating composition to the applicator using the flow value and wherein said circuit is operable to regulate the flow of coating composition only after said circuit has determined that the coating composition is flowing to the applicator.

19. A controller as defined in claim 14, wherein said circuit is operable to store a parameter value representing a process parameter that is not controlled by said circuit, and wherein said circuit is operable to thereafter monitor the process parameter and provide an alarm notification if the monitored process parameter moves outside of a range of values that includes the stored value of the process parameter.

20. A method of controlling the flow of a coating composition using a flow control valve that responds to a valve control signal to regulate the flow of coating composition, comprising the steps of:

obtaining a setpoint representing a desired flow of a coating composition;

iteratively monitoring the flow of the coating composition and adjusting the valve control signal until the flow of coating composition equals the desired flow;

storing the adjusted valve control signal;

operating the control valve with the valve control signal at commencement of coating composition flow; and regulating the flow of coating composition using closed loop control after commencement of the flow of coating composition.

\* \* \* \* \*